United States Patent [19] [11] 3,972,066
Seki et al. [45] July 27, 1976

[54] METHOD FOR IMAGE REGULATION OF COLOR MONITORS IN PROOF-VIEWING AND AN APPARATUS THEREFOR

[75] Inventors: Ikuo Seki, Tokyo; Masahiko Kato, Kodaira, both of Japan

[73] Assignees: Toppan Printing Co., Ltd.; Hitachi Electronics Ltd., both of Tokyo, Japan

[22] Filed: Dec. 19, 1974

[21] Appl. No.: 534,367

[30] Foreign Application Priority Data
  May 31, 1974  Japan................ 49-61504

[52] U.S. Cl. .............................................. 358/76
[51] Int. Cl.² ......................................... H04N 9/02
[58] Field of Search ............................ 358/76, 80

[56] References Cited
UNITED STATES PATENTS

| | | | |
|---|---|---|---|
| 3,098,895 | 7/1963 | Loughlin | 358/76 |
| 3,128,333 | 4/1964 | Loughlin | 358/76 |
| 3,324,235 | 6/1967 | Kyte | 358/80 |
| 3,629,490 | 12/1971 | Keller | 358/80 |
| 3,758,707 | 9/1973 | Keller | 358/80 |

*Primary Examiner*—John C. Martin
*Attorney, Agent, or Firm*—Ostrolenk, Faber, Gerb & Soffen

[57] ABSTRACT

A method for image regulation of a color monitor in proof-viewing and an apparatus therefor which is characterized in that the image on the color monitor is caused to closely resemble the printed picture, and said method comprises the steps of: scanning separation films of primary colors to obtain primary color picture signals; obtaining secondary color picture signals from the NAM (Non-Additively Mixing) portions which are derived by detecting the maximum value of two of said primary color picture signals respectively; while obtaining a tertiary color picture signal from the NAM portion of said primary color picture signals; regulating said secondary and tertiary color picture signals by multiplying regulation factors; correcting the gradation of said primary color picture signals by said regulated secondary and tertiary color picture signals; and producing an image on a color monitor screen with said corrected primary color picture signals.

6 Claims, 22 Drawing Figures

FIG.1

$\overline{Y}$ $\overline{M}$ $\overline{C}$

FIG.2

$\overline{YM}$ $\overline{MC}$ $\overline{CY}$ $\overline{YMC}$

FIG.3

$-\overline{YM}$ $-\overline{MC}$ $-\overline{CY}$ $-\overline{YMC}$

FIG.4

$-\overline{YM} \times \alpha$ $-\overline{MC} \times \beta$

$-\overline{CY} \times \gamma$ $-\overline{YMC} \times \delta$

FIG.5

$\overline{Y} + r + g + bl$

100%

0%

$\overline{M} + r + b + bl$

$\overline{C} + b + g + bl$

$-\overline{YM}$

↑
P

$-\overline{MC}$

↑
P $-\overline{CY}$

↑
P $-\overline{YMC}$

$-\overline{YM} \times \alpha$

$-\overline{MC} \times \beta$ $-\overline{CY} \times \gamma$ $-\overline{YMC} \times \delta$

FIG.11

$\overline{Y}+r+g+bl$ $\overline{M}+r+b+bl$ $\overline{C}+b+g+bl$

Y MC  MC  YMC
YM  CY

$\overline{Y}$    $\overline{YM}$    $-\overline{YM}$

$\overline{M}$    $\overline{MC}$    $-\overline{MC}$ $\overline{C}$    $\overline{CY}$    $-\overline{CY}$ $\overline{YMC}$    $-\overline{YMC}$

FIG.17   FIG.18   FIG.19

$-\overline{YM}+\overline{YMC}$     $(-\overline{YM}+\overline{YMC})\times a$     $\overline{Y}+r'+g'+bl'$ $-\overline{MC}+\overline{YMC}$     $(-\overline{MC}+\overline{YMC})\times d$     $\overline{M}+r'+b'+bl'$

$-\overline{CY}+\overline{YMC}$     $(-\overline{CY}+\overline{YMC})\times e$     $\overline{C}+b'+g'+bl'$ $-\overline{YMC}\times f$

METHOD FOR IMAGE REGULATION OF COLOR MONITORS IN PROOF-VIEWING AND AN APPARATUS THEREFOR

BACKGROUND OF THE INVENTION

1. Field of the Invention

This invention relates to a method for image regulation of color monitors in proof-viewing and an apparatus therefor. More particularly, the invention relates to such method and apparatus in which the image on a color monitor screen can be corrected so as to closely resemble the quality of color printings to be formed. Furthermore, in the present invention, the data of said color monitor regulation can be advantageously utilized to the correction or retouching in the practical color printing process, thus faithful and full-color reproduction of colored original can be easily obtained. The term "proof-viewing" used herein means the act of observing the proof image in order to correct the press plates in the plate-making.

2. Description of Prior Art

Pictures including photographs speak a universal language, attract attention, arouse interest, convey ideas, illustrate and clarify contents of text. This is especially true for colored pictures; accordingly, the demand for colored illustrations in printing is constantly increasing.

When multi-colored printings are made from a colored original according to the prior art, the color separation and retouching are carried out giving consideration to the printing conditions, and the proof plates must be made. Then, the proof sheet is made by printing on the substrate to be used by employing said proof plates and a proof press, and the printed proof sheet is observed to determine whether the retouching is properly effected and the original is well reproduced. As a matter of fact, it is seldom that a desired reproduction is made only by one proof-viewing, and therefore corrections and proof-viewing must be generally carried out several times in order to obtain satisfactory color printings.

For example, in case the proof sheet is rather reddish on the whole as compared with the colored original, the red plate has to be retouched again so as to reduce the red color content. Then, a new proof sheet is made to confirm that the red color is weakened, thus such corrections and proof printing must be repeated until a desired proof sheet can be obtained. Meanwhile, when a satisfactory reproduction is formed through the above trials, the press plates for practical use are made on the basis of the results obtained from the above corrections. However, the above-mentioned determination of printing conditions takes much labour and troubles in proof plate making and proof printing, and in addition, it takes a lot of time. Furthermore, the retouching of color plates requires special mechanical skill and artistic technique through knowledge of color composition.

To this proof-viewing method in the prior art, some electronic proof-viewing devices which utilizing television monitors have been worked out. As an example of such devices, Color Previewer was put on sale several years ago by Hazeltine Corporation in the U.S.A. In this device, each of four color continuous tone negatives is separately received by each independent optical system; several corrections are imparted to each color system, and an image is then reproduced on the color display screen of the device, whereby the proof-viewing can be carried out. Devices of this type are used for correcting the hues and tones of respective colors in conformity with the characteristics of paper and inks to be used on the basis of Neugebauer equations. The image, however, can not be fully approximated to the final printings and the operation of the device is somewhat difficult, so that it might hardly be put to practical use.

BRIEF SUMMARY OF THE INVENTION

In the present invention, separation films obtained by color separation of a colored original under predetermined conditions, are photoelectrically scanned for translation into color picture signals, and an image resembling the printing to be produced is reproduced on a color monitor, where the image is corrected or regulated by observing so as to determine the several conditions for the practical plate-making operation. Accordingly, the present invention relates to a method for correcting the image of a color monitor as well as to an apparatus utilizing such method.

In the above procedure, the colors of printing inks and the fluorescent colors of a color monitor television are usually different from each other and the principles of colors syntheses in presswork and on television screens are also different, so that the hues and gradations of respective colors, especially of secondary colors and tertiary colors between said two systems might become different.

In view of the above, the principal object of the present invention is to provide an improved method for regulating the color gradation of the color monitor image, which solves this sort of problem.

Another object of the present invention is to provide a novel apparatus for carrying out the above method.

BRIEF DESCRIPTION OF THE DRAWINGS

These and other features of the present invention will be more fully understood by referring to the following detailed description presented solely for the purpose of illustration and to the accompanying drawings in which:

FIGS. 1 to 5, inclusive, are graphical representations of color picture signals for explaining the first example to obtain the corrected picture signals of yellow, magenta and cyan from the original primary color picture signals, where;

FIG. 5 is graphical representation of the corrected picture signals of yellow, magenta and cyan;

FIG. 6 to 11, inclusive, are graphical representations similar to FIGS. 1 to 5 to obtain regulated signals of yellow, magenta and cyan from the primary color signals using color bar image signals, where;

FIGS. 14 to 19 are graphical representations of the picture signals in another example of the method of the present invention, where;

DETAILED DESCRIPTION OF THE INVENTION

When a colored original picture such as a color photograph is printed by a printing press, a set of separation films are prepared by isolating the colors of the original picture. The methods for the color separation are classified into three categories, that is, a method by photographing the colored original through color filters, another method using an electronic photoengraving machine such as Vario-Klischograph or Herio-Klischograph, and the third method using a color scanner. Further, the kinds of color separation films are classified as continuous tone positives, continuous tone negatives, halftone positives and halftone negatives. According to the method and apparatus of the present invention, any classification of separation films and category of preparation method can be employed.

When the colored original is subjected to color separation as disclosed in the above, the color is separated generally to yellow (Y), magenta (M), cyan (C) (primary colors), and black (Bl). Accordingly, the present invention will be explained in connection with the separation films of said three primary colors and black. It should be noted, however, that the present invention can be applied to any separation films which are prepared through a special color separation method, and it should come within the scope of the present invention.

The term "primary color" as used hereinafter denotes each color of yellow, magenta or cyan. The term "secondary color" denotes a color which is formed by combining two colors of the three primary colors, where the ratio of combination is not restricted. Further, the term "tertiary color" denotes a color obtained by combining said three primary colors, where the ratio of combination is not restricted.

As disclosed in the above, the separation films of continuous tone negatives or positives, or of screen negatives or positives, are firstly prepared, and the films are placed on a scanning apparatus, prior to being scanned to obtain the picture signals. Image signals of red, blue and green are then obtained by converting said picture signals through a matrix circuit and the image is reproduced on a color monitor. The gradation of the image thus produced on the screen is, however, different from that of a printed picture owing to the above-mentioned reason. In other words, in case the colors of a printed picture, which is produced by forming printing plates from separation films and by printing using said plates, are compared with the colors of an image on the monitor screen produced by scanning said separation films, converting the scanned signals to image signals and by applying said signals to the monitor screen, the gradations of colors are very different from each other. These differences of gradations are large and serious in the regions of secondary colors and tertiary colors.

When the separation films are prepared from a colored original, the problem of reproduction of the tertiary color is generally solved by the method of under color removal, and there has been no necessity of such measures for the secondary colors. However, when the image is reproduced from the separation films by using a color monitor, if the quantities of primary colors are fully increased, the quantities of secondary colors from the middle tone to shadow portions are also increased much too closely to the saturation level, with the result that the gradations in such portions become insufficient. On account of this fact, the secondary colors are regulated by under color removal, and the tertiary color portions are also decreased by multiplying the tertiary color signal portions in the primary colors by a certain factor. Thereby, the image on the color monitor can be caused to resemble the quality of a printed picture.

In the prior art, the regulation of tertiary color is generally known in connection with electronic photoengraving machines, while the regulation or correction of secondary colors is not known at all. The present invention has been accomplished by paying attention to this fact.

As compared with the gradation of secondary colors in a printed picture, the gradation from the middle tone to shadow portions of the image on the color monitor is insufficient, so that the signals of secondary color portions could be regulated so as to approximate the gradation of printed pictures. Accordingly, the regulation of gradation is carried out by the under color removal of the secondary colors.

Figure 1:
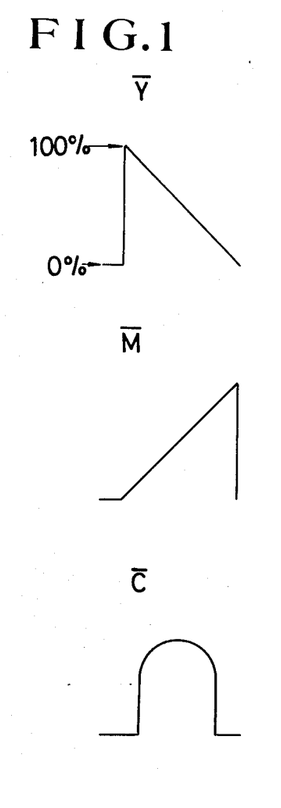
FIG. 1 is graphical representation of primary color picture signals of a color television field.
Figure 2:
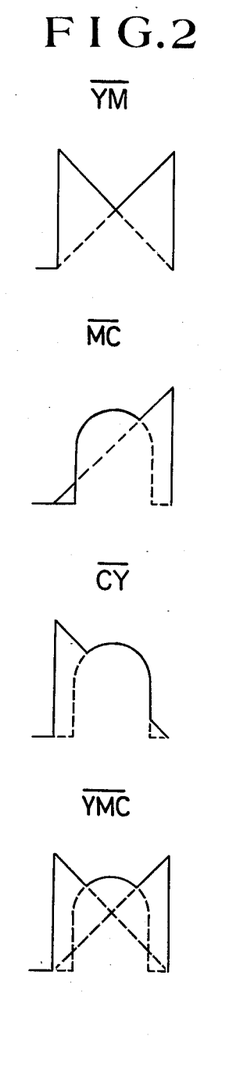
FIG. 2 is graphical representation of secondary and tertiary color picture signals obtained from the primary color picture signals.
Figure 3:
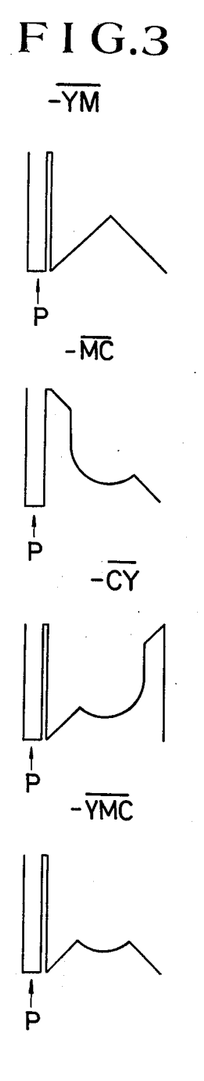
FIG. 3 is graphical representation of reversed secondary and tertiary color signals.

In the following, the regulation of secondary colors will be explained: One television line of the picture signals obtained by scanning separation films of primary colors is shown in FIG. 1. The waveforms marked $\overline{Y}$, $\overline{M}$ and $\overline{C}$ are the picture signals representing the negative values of yellow Y, magenta M and cyan C, that respectively, is to say, they indicate the intensities of complementary colors of each respective primary color. For example, as the value of yellow approaches 100%, the optical density of yellow becomes proportionally small. On the other hand, when the value approaches 0%, the optical density of yellow becomes large. Then, the color signals of yellow and magenta, magenta and cyan, and cyan and yellow are respectively combined to obtain the secondary color signals as shown in FIG. 2. These secondary color signals are NAM portions which are derived by detecting the maximum value of a pair of the three primary color signals, yellow $\overline{Y}$, magenta $\overline{M}$ and cyan $\overline{C}$, by NAM (Non-Additively Mixing, cf. The Journal of SMPTE (vol. 73, pages 658–660) or U.S. Pat. No. 3,371,160) means; the resulting signals being indicated as $\overline{YM}$, $\overline{MC}$ and $\overline{CY}$. The secondary color signals which consist of the NAM portions of two of the three primary color signals are detected by detecting circuits. Further, the quantity of ink at 100% level of picture signal is zero and the quantity of ink is determined in the zero percent direction on the basis of this 100% level. Therefore, the addition and substraction of the ink quantity is easily made by obtaining the level corresponding to zero in the ink quantity. Thus, the secondary color signals are reversed and the pulses indicated by P in FIG. 3, corresponding to the level of 100% position, are mixed in each retrace period, whereby the reversed secondary color signals $-\overline{YM}$, $-\overline{MC}$ and $-\overline{CY}$ are obtained as shown in FIG. 3.

Figure 4:
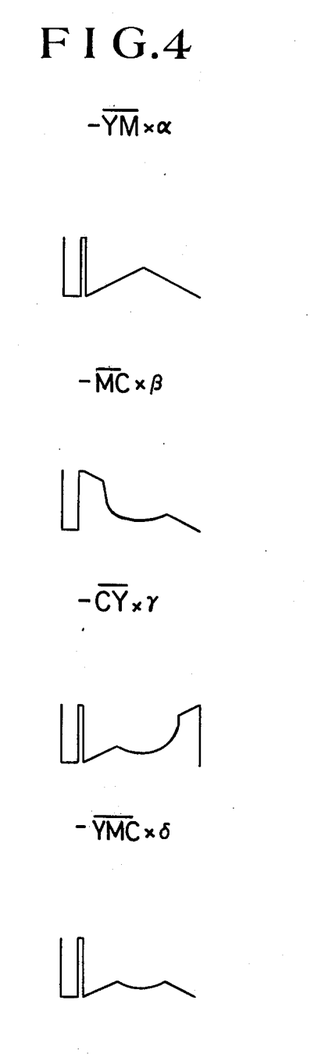
FIG. 4 is graphical representation of the secondary and tertiary color picture signals after the corrections with regulation factors.

Then, the regulated color signals $-\overline{YM}\cdot\alpha$, $-\overline{MC}\cdot\beta$ and $-\overline{CY}\cdot\gamma$ as shown in FIG. 4 are obtained by regulating the above-mentioned reversed secondary color signals through regulating circuits. These regulation factors $\alpha$, $\beta$ and $\gamma$ are different in accordance with the kinds of printing plates, printing inks and so forth. However, the magnitude of the value of each of said regulation factors may be previously determined and arranged in tabular form. Further, these values of regulation factors may be linear or nonlinear. The above-mentioned regulated secondary color signals $-\overline{YM}\cdot\alpha$, $-\overline{MC}\cdot\beta$ and $-\overline{CY}\cdot\gamma$ are then added to the foregoing picture signals, yellow $\overline{Y}$, magenta $\overline{M}$ and cyan $\overline{C}$ to produce corrected picture signals $\overline{Y}'$, $\overline{M}'$ and $\overline{C}'$.

The image is then produced by combining the above-mentioned corrected picture signals $\overline{Y}'$, $\overline{M}'$ and $\overline{C}'$ on the color monitor without darkening each of the secondary colors (e.g. red, blue and green). In consequence, the quality of image on the color monitor can be improved and the image having the gradients of respective colors resembling those of the printed picture can be produced. Therefore, it will be understood that the effect of said correction is quite large.

The correction of secondary colors has been explained in the above, while with regard to the tertiary color, the NAM portion ($\overline{YMC}$ in FIG. 2) of the picture signals yellow $\overline{Y}$, magenta $\overline{M}$ and cyan $\overline{C}$ is detected in like manner as the secondary colors, and it is reversed likewise. The reversed signal is then regulated with a regulation factor $\delta$ and added to each picture signal of yellow, magenta and cyan.

In the above description, the scanning of separation films, conversion to electrical signals and the corrections of secondary colors and tertiary color for projecting on the color monitor have been explained, which will summarized as follows:

Provided that the primary color picture signals are $\overline{Y}$, $\overline{M}$ and $\overline{C}$;

the NAM portion of $\overline{Y}$ and $\overline{M}$ is $\overline{YM}$, and its regulation factor is $\alpha$;

the NAM portion of $\overline{M}$ and $\overline{C}$ is $\overline{MC}$, and its regulation factor is $\beta$;

the NAM portion of $\overline{C}$ and $\overline{Y}$ is $\overline{CY}$, and its regulation factor is $\gamma$;

the NAM portion of $\overline{Y}$, $\overline{M}$ and $\overline{C}$ is $\overline{YMC}$, and its regulation factor is $\delta$; and the values of regulation are $r$, $g$, $b$ and $bl$; the equations of said values of regulation are:

$r = -\overline{YM}\cdot\alpha$,
$b = -\overline{MC}\cdot\beta$,
$g = -\overline{CY}\cdot\gamma$, and
$bl = -\overline{YMC}\cdot\delta$.

Further, the picture signals corrected in the secondary and tertiary color contents are:

$\overline{Y}' = \overline{Y} + r + g + bl$,
$\overline{M}' = \overline{M} + r + b + bl$, and
$\overline{C}' = \overline{C} + b + g + bl$.

Figure 5:
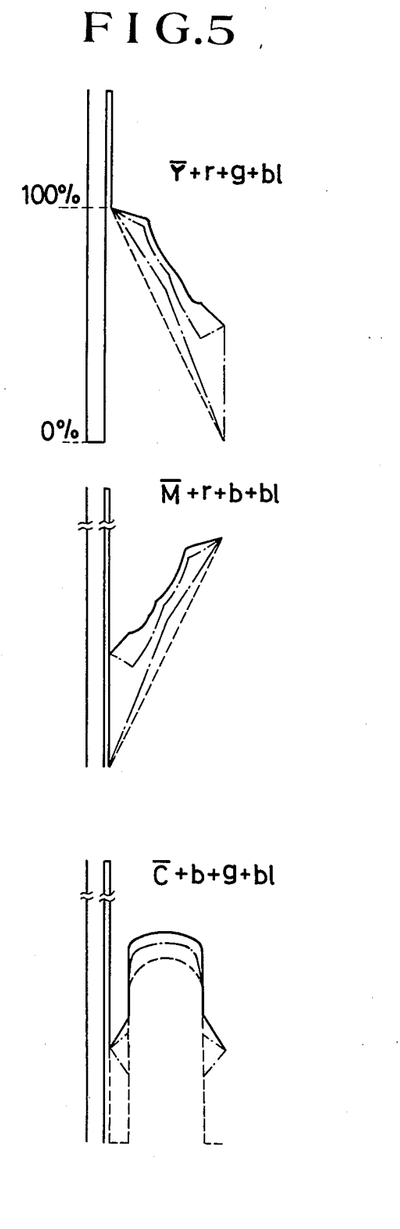

As shown in FIG. 5, the secondary and tertiary color portions of the corrected signals $\overline{Y}'$, $\overline{M}'$ and $\overline{C}'$ are shifted to some extent from 0% to 100% and therefore said portions are corrected to the brighter direction.

Thus obtained, corrected picture signals $\overline{Y}'$, $\overline{M}'$ and $\overline{C}'$ are then converted to the image signals of red, blue and green through a matrix circuit, and produce an image on the color monitor resembling the printed picture to be made.

Figure 6:
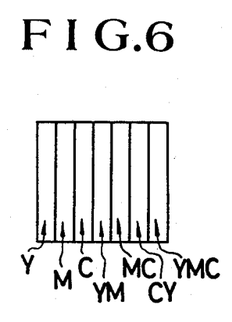
FIG. 6 is a pattern of color bar images.
Figure 7:
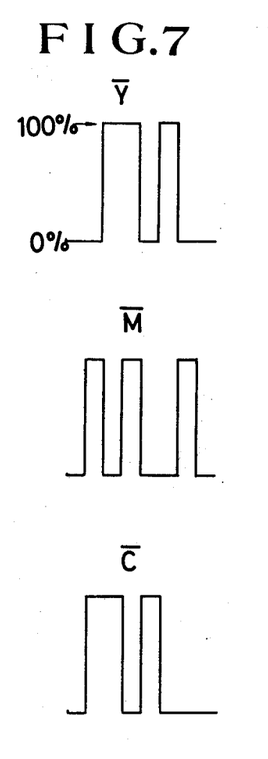
FIG. 7 is graphical representation of the primary color signals obtained from said color bar images in FIG. 6.
Figure 8:
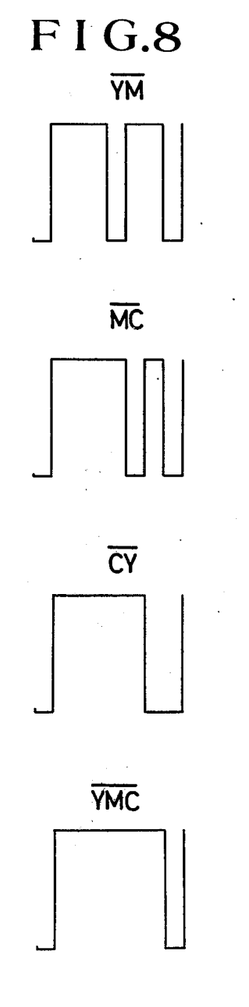
FIG. 8 is graphical representation of the secondary and tertiary color signals obtained from said primary color signals.

Another example of the image correction will now be explained in the following according to the accompanying drawings, especially from FIG. 6 to FIG. 11 by using color bar signals as the source of primary color signals. FIG. 6 shows a color bar image, and when it is converted into picture signals, the primary color signals $\overline{Y}$, $\overline{M}$ and $\overline{C}$ as shown in FIG. 7 are obtained. FIG. 8 shows the aforementioned picture signals $\overline{YM}$, $\overline{MC}$ and $\overline{CY}$. The picture signals $-\overline{YM}$, $-\overline{MC}$ and $-\overline{CY}$ shown in FIG. 9 are obtained by reversing the signals $\overline{YM}$, $\overline{MC}$ and $\overline{CY}$, and combining the pulse (the portion P in FIG. 9).

Figures 9, 10:
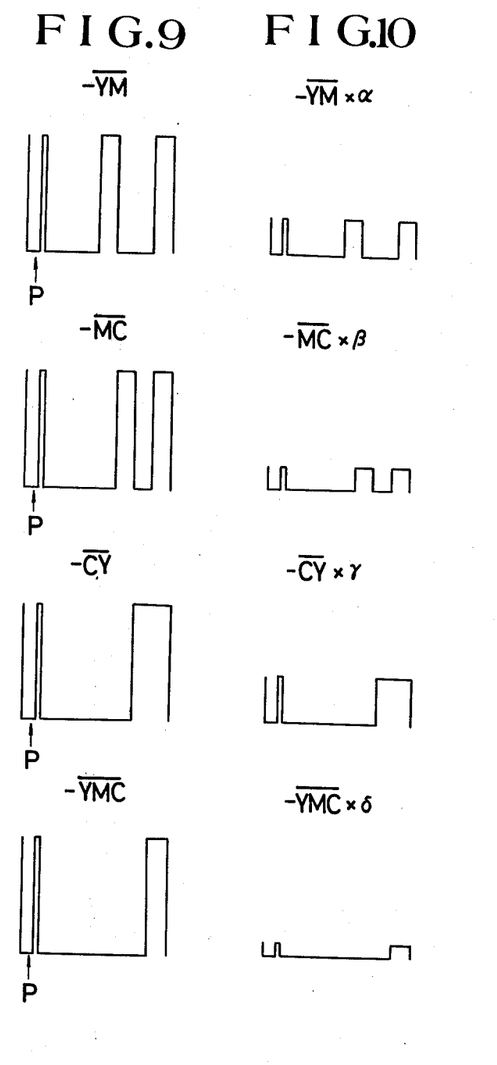
FIG. 9 is a graphical representation of the reversed secondary and tertiary color signals.
FIG. 10 is graphical representation of the reversed secondary and tertiary color signals after correction with regulation factors.
Figure 11:
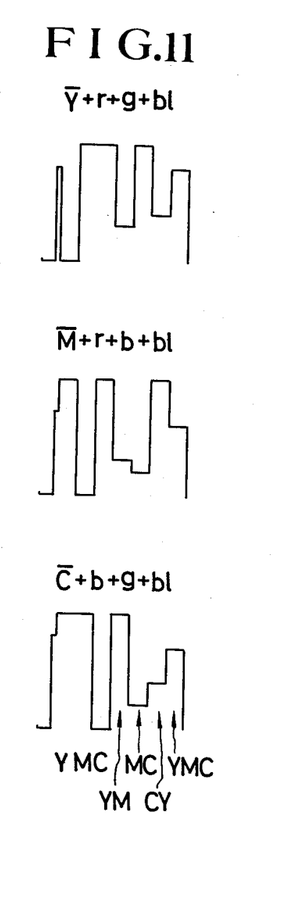
FIG. 11 is graphical representation of the corrected picture signals of yellow, magenta and cyan.

The picture signals shown in FIG. 10 are obtained by regulating the above signals in FIG. 9 with the respective regulation factors $\alpha$, $\beta$, $\gamma$ and $\delta$. In FIG. 11, the picture signals of $(\overline{Y}' = \overline{Y} + r + g + bl)$, $(\overline{M}' = \overline{M} + r + b + bl)$ and $(\overline{C}' = \overline{C} + b + g + bl)$ are shown. According to the present invention, the primary colors of yellow, magenta and cyan in the picture signals of FIG. 11 are not corrected, while the secondary colors of red (YM in FIG. 11), green (CY in FIG. 11), blue (MC in FIG. 11) and grey (YMC in FIG. 11) are changed by the regulation factors $\alpha$, $\beta$, $\gamma$ and $\delta$, thus they are shifted from 0% to 100% and the color contents are reduced.

Figure 12:
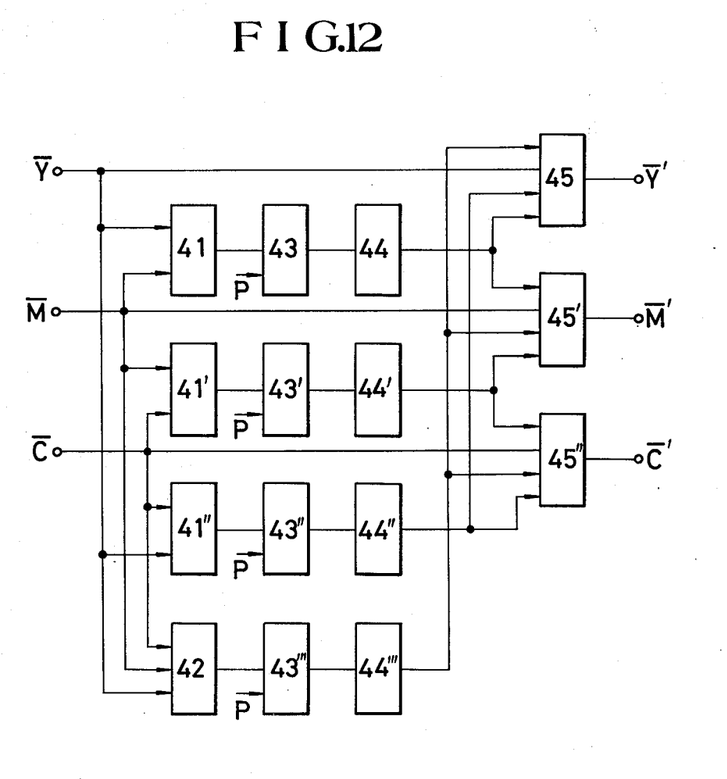
FIG. 12 is a block diagram of the apparatus to carry out the method of the present invention as explained in connection with FIGS. 1 – 5 and FIGS. 6 to 11.

An embodiment of block diagram for the above correction method of the present invention is shown in FIG. 12. The picture signals, $\overline{Y}$, $\overline{M}$ and $\overline{C}$ shown in the foregoing FIG. 1 are connected to the terminals $\overline{Y}$, $\overline{M}$ and $\overline{C}$, respectively. Said $\overline{Y}$, $\overline{M}$ and $\overline{C}$ are then connected to detecting circuits 41, 41' and 41'' of the secondary color composite signals, respectively, to detect the signals $\overline{YM}$, $\overline{MC}$ and $\overline{CY}$ shown in FIG. 2. Simultaneously, said picture signals are connected to another detecting circuit 42 of the tertiary color composite signal to obtain the signal $\overline{YMC}$. The circuits 43 – 43''' are used to reverse and add the pulses (shown by P in FIG. 12), thus each of the picture signals $\overline{YM}$, $\overline{MC}$, $\overline{CY}$ and $\overline{YMC}$ is reversed and added with the pulse P to obtain the signals $-\overline{YM}$, $-\overline{MC}$, $-\overline{CY}$ and $-\overline{YMC}$ as shown in FIG. 3. The circuits 44 – 44''' are regulating circuits, and with these circuits, the signals $-\overline{YM}$, $-\overline{MC}$, $-\overline{CY}$ and $-\overline{YMC}$ are regulated by the above-mentioned regulation factors $\alpha$, $\beta$, $\gamma$ and $\delta$ to obtain the picture signals $-\overline{YM} \times \alpha$, $-\overline{MC} \times \beta$, $-\overline{CY} \times \gamma$, and $-\overline{YMC} \times \gamma$ as shown in FIG. 4. The circuits 45 – 45'' are addition circuits to which the signals $\overline{Y}, \overline{M}, \overline{C}, -\overline{YM} \times \alpha, -\overline{MC} \times \beta, -\overline{CY} \times \gamma$ and $-\overline{YMC} \times \delta$ are connected and are added respectively to produce the corrected outputs $\overline{Y}', \overline{M}'$ and $\overline{C}'$.

Figure 13:
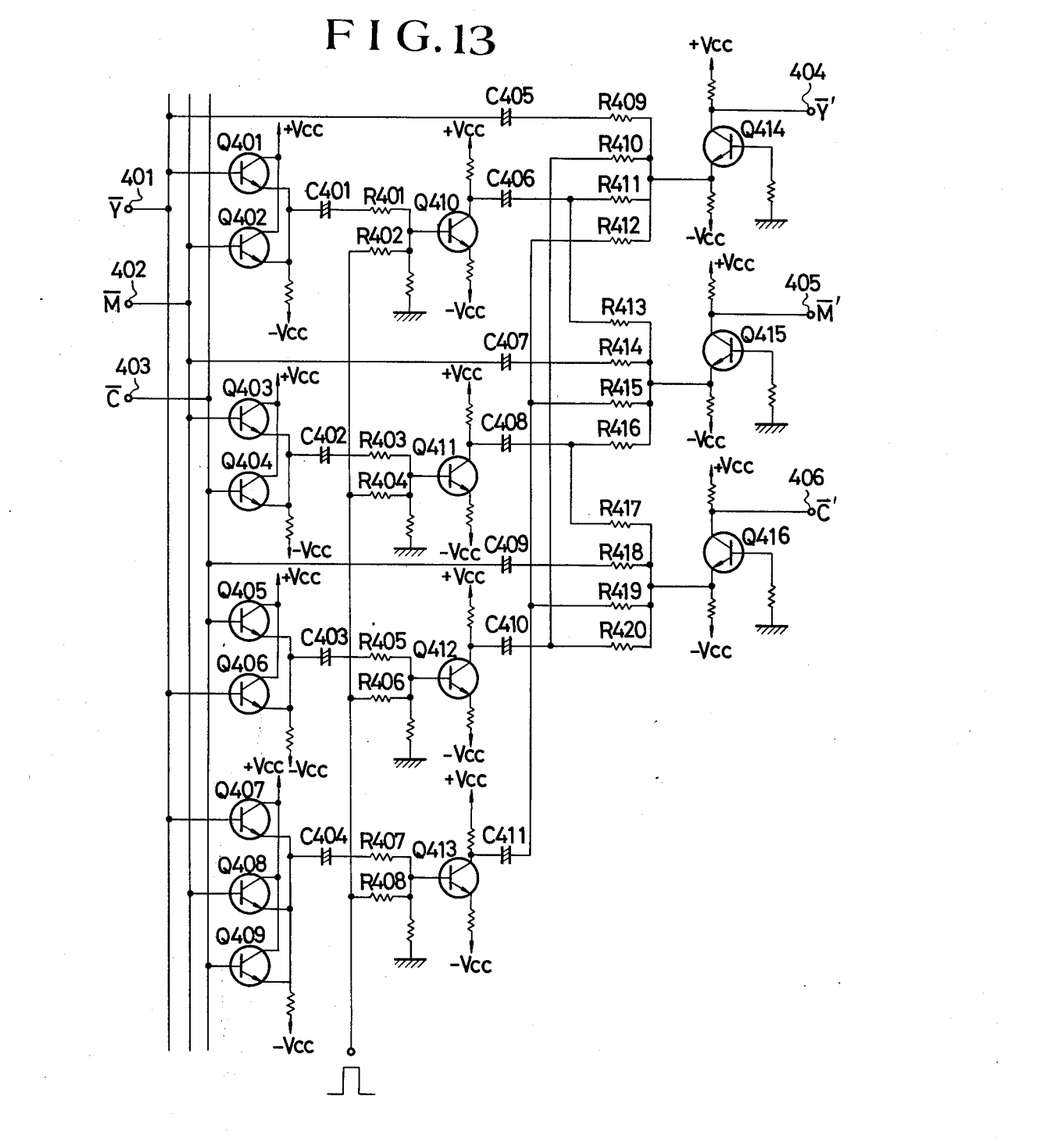
FIG. 13 is a detailed circuit diagram of said apparatus.

Further, the embodiment of the present invention will be explained in the following according to the circuit diagram in FIG. 13. The primary color picture signals $\overline{Y}, \overline{M}$ and $\overline{C}$ are connected to the input terminals 401, 402 and 403, respectively. The picture signals $\overline{Y}$ and $\overline{M}$ are connected to the bases of transistors Q401 and Q402, respectively, and the emitters of said transistors Q401 and Q402 are connected with each other, thus only the signal of the base input having a higher DC potential is passed so that the NAM portion ($\overline{YM}$ in FIG. 2) of the picture signals $\overline{Y}$ and $\overline{M}$ can be taken out from the emitters. In like manner, the NAM portion ($\overline{MC}$ in FIG. 2) of the picture signals $\overline{M}$ and $\overline{C}$ are taken out from the emitters of transisters Q403 and Q404, the NAM portion ($\overline{CY}$ in FIG. 2) of the picture signals $\overline{C}$ and $\overline{Y}$ from the emitters of transisters Q405 and Q406, and the NAM portion ($\overline{YMC}$ in FIG. 2) of the picture signals $\overline{Y}, \overline{M}$ and $\overline{C}$ from the emitters of transisters Q407, Q408 and Q409. The signal $\overline{YM}$ through a capacitor C401 and a resistor R401, and the positive pulse (P in FIG. 13) through a resistor R402, are connected to the base of a transistor Q410 and the combined signal of reversed $\overline{YM}$ signal and reversed pulse is obtained from the collector of the transistor Q410. The amount of addition of the pulse is determined by the impedance of the resistor R402, and as will be understood from the indication $-\overline{YM}$ in FIG. 3, it coincides with the minimum level of $-\overline{YM}$.

In like manner as the above, the signal $\overline{MC}$ through a capacitor C402 and a resistor R403, and the positive pulse through a resistor R404, are connected to the base of a transistor Q411, and the picture signal $-\overline{MC}$ in FIG. 3 is obtained from the collector of the transistor Q411. Further, the signal $\overline{CY}$ through a capacitor C403 and a resistor R405, and the positive pulse through a resistor R406, are connected to the base of a transistor Q412, and the reversed signal $-\overline{CY}$ in FIG. 3 is obtained from the collector of the transistor Q412. The signal $\overline{YMC}$ through a capacitor C404 and a resistor R407, and the positive pulse through a resistor R408 are connected to the base of a transistor Q413, and the picture signal of $-\overline{YMC}$ In FIG. 3 is obtained from the collector of the transistor Q413.

The signal $\overline{Y}$ through a capacitor C405 and a resistor R409, $-\overline{CY}$ through a resistor R410, $-\overline{YM}$ through a capacitor C406 and a resistor R411, and $-\overline{YMC}$ through a capacitor C411 and a resistor R412 are connected to the emitter of an addition transistor Q414 to obtain a combined output $\overline{Y}'$ from the collector of the transistor Q414. The regulation factors $\alpha, \gamma$ and $\delta$ are determined by the impedances of the resistors R410, R411 and R412, In like manner as the above, to the emitter of another addition transistor Q415 are connected $-\overline{YM}$ through the capacitor C406 and a resistor R413, $\overline{M}$ through a capacitor C407 and a resistor R414, $-\overline{YMC}$ through the capacitor C411 and a resistor R415, and $-\overline{MC}$ through the capacitor C408 and a resistor R416. Thereby, the combined output $\overline{M}'$ is obtained from the collector of the transistor Q415.

Further, to the emitter of the other transistor Q416 are connected $-\overline{MC}$ through a capacitor C408 and a resistor R417, $\overline{C}$ through a capacitor C409 and a resistor R418, $-\overline{YMC}$ through the capacitor C411 and a resistor R419, and $-\overline{CY}$ through the capacitor C410 and a resistor R420, thus the combined output $\overline{C}'$ is obtained from the collector of the transistor Q416.

Figure 14:
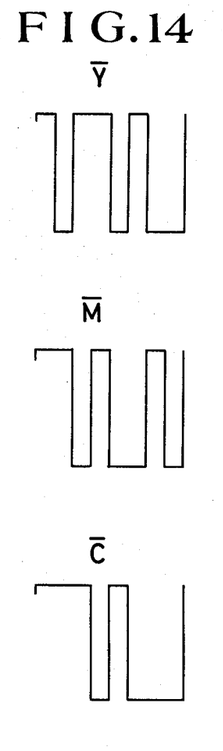
FIG. 14 is graphical representation of the primary color signals obtained from the color bars in FIG. 6.
Figure 15:
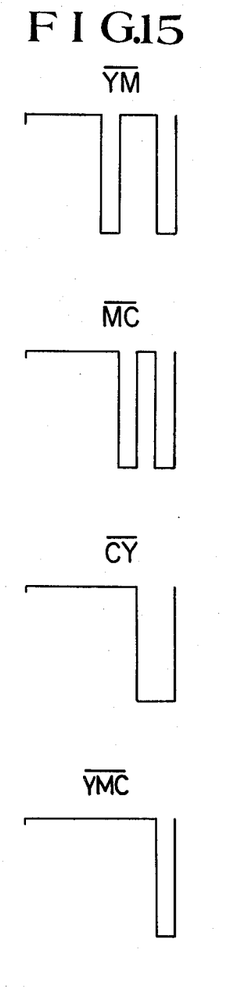
FIG. 15 is graphical representation of the secondary and tertiary color signals obtained from the primary color signals.

In the following, another correcting method of the present invention will be explained. The color bar image in FIG. 6 is converted to the picture signals of $\overline{Y}, \overline{M}$ and $\overline{C}$ in FIG. 7. FIG. 14 indicates picture signals $\overline{Y}, \overline{M}$ and $\overline{C}$ which are obtained by adding pulses having the corresponding 100% levels of the signals $\overline{Y}, \overline{M}$ and $\overline{C}$ in FIG. 7 to each retrace period of said signals $\overline{Y}, \overline{M}$ and $\overline{C}$. The width of the pulse to be added is the same as the retrace period in this example. The secondary color picture signals may be obtained by combining the primary color signals of yellow and magenta, magenta and cyan, or cyan and yellow. As shown in FIG. 15, these secondary color picture signals are the NAM portions of each signals $\overline{Y}, \overline{M}$ and $\overline{C}$, and said secondary color signals are indicated by $\overline{YM}, \overline{MC}$ and $\overline{CY}$ in FIG. 15. After detecting the NAM portions of the primary color picture signals of yellow, magenta and cyan through detecting circuits, the obtained secondary color picture signals $\overline{YM}, \overline{MC}$ and $\overline{CY}$ in FIG. 15 are reversed to produce the signals $-\overline{YM}, -\overline{MC}$ and $-\overline{CY}$ in FIG. 16. The tertiary color signal $\overline{YMC}$ in FIG. 15 which is obtained through a tertiary color detecting circuit is added to the reversed signals $-\overline{YM}, -\overline{MC}$ and $-\overline{CY}$ in FIG. 16, respectively. Thus the tertiary color contents in the secondary colors are eliminated to obtain the signals of $-\overline{YM}+\overline{YMC}, -\overline{MC}+\overline{YMC}$ and $-\overline{CY}+\overline{YMC}$ as shown in FIG. 17.

Figure 17:
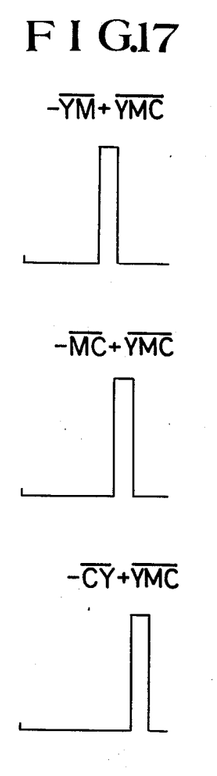
FIG. 17 is graphical representation of the secondary color signals in which the tertiary color contents in FIG. 15 are added to the picture signals in FIG. 16.
Figure 18:
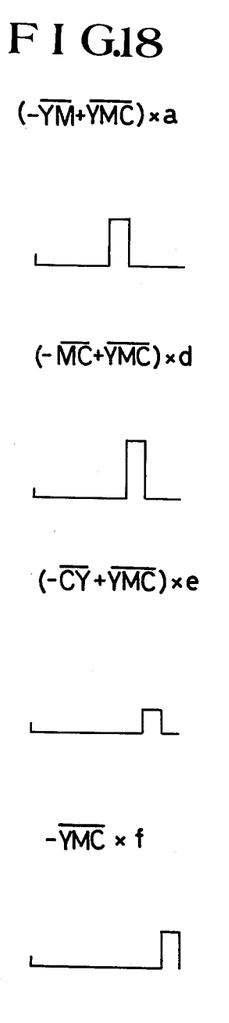
FIG. 18 is graphical representation of picture signals in which the signals in FIG. 17 are corrected by the regulation factors.
Figure 19:
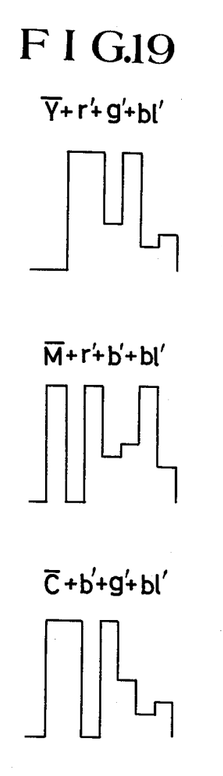
FIG. 19 is graphical representation of the corrected picture signals of yellow, magenta and cyan.

By removing the tertiary color contents in the secondary color signals, in case the ratio of r which is added to Y and M in FIG. 19 is changed, the hue of red color is varied, however, there is no effect on the hue of the tertiary color. The picture signals $(-\overline{YM}+\overline{YMC})xa$, $(-\overline{MC}+\overline{YMC})xd$ and $(-\overline{CY}+\overline{YMC})xe$ in FIG. 18 are obtained by applying the predetermined regulation factors to said signals $-\overline{MY}+\overline{YMC}, -\overline{CM}+\overline{YMC}$ and $-\overline{YC}+\overline{YMC}$ in FIG. 17. The regulation factors $a, d$ and $e$ are varied according to the kinds of printing plates, printing inks, printing paper and so forth. However, the values of the regulation factors may be determined and shown in, for example, a table formulated in advance. The regulation signals in FIG. 18 are added to the signals $\overline{Y}, \overline{M}$ and $\overline{C}$ through appropriate linear or non-linear circuits.

Figure 16:
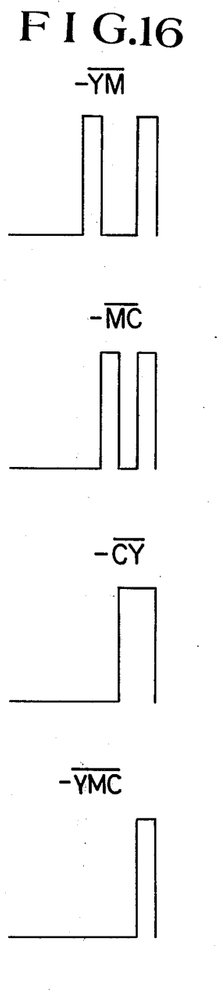
FIG. 16 is graphical representation of the reversed secondary and tertiary color signals.

In like manner as the secondary colors, the tertiary color signal $\overline{YMC}$ in FIG. 15 is obtained by detecting the NAM portions of the primary color signals $\overline{Y}, \overline{M}$ and $\overline{C}$ in FIG. 7, and reversing to obtain the signal $-\overline{YMC}$ in FIG. 16. Further applying a regulation factor $f$, the signal $-\overline{YMC} \times f$ in FIG. 18 can be obtained.

The summary of the regulation of the secondary and tertiary colors are as follows:

Provided that the primary color picture signals are $\overline{Y}, \overline{M}$ and $\overline{C}$;

the NAM portion of $\overline{Y}$ and $\overline{M}$ is $\overline{YM}$, and its regulation factor is $a$;

the NAM portion of $\overline{M}$ and $\overline{C}$ is $\overline{MC}$, and its regulation factor is $d$;

the NAM portion of $\overline{Y}$ and $\overline{C}$ is $\overline{CY}$, and its regulation factor is $e$;

the NAM portion of $\overline{Y}, \overline{M}$ and $\overline{C}$ is $\overline{YMC}$, and its regulation factor is $f$; and the values of the regulations are $r', g', b'$ and $bl'$.

Then, $r' = (-\overline{YM}+\overline{YMC}) \times a$ $b' = (-\overline{MC}+\overline{YMC}) \times d$ $g' = (-\overline{CY} + \overline{YMC}) \times e$
$bl' = -\overline{YMC} \times f,$
and the signals $\overline{Y}'$, $\overline{M}'$ and $\overline{C}'$ after the regulations with the secondary colors and tertiary color are:
$\overline{Y}' = \overline{Y} + r' + g' + bl'$
$\overline{M}' = \overline{M} + r' + b' + bl'$
$\overline{C}' = \overline{C} + g' + b' + bl'$.

As shown by $\overline{Y}'$, $\overline{M}'$ and $\overline{C}'$ in FIG. 19, the portions of $\overline{YM}$, $\overline{MC}$, $\overline{CY}$ and $\overline{YMC}$ are shifted from 0% to 100% according to the regulation factors. For example, each color of red, green or blue is not darkened, and the gradation of the tertiary color is not also darkened, so that the image closely resembling the printed picture can be produced, therefore the above-mentioned regulation is very effective. Further, even when the regulation factors $a$, $d$ and $e$ are changed, the portion corresponding to $\overline{YMC}$ in FIG. 6 is not subject to any influence.

Figure 20:
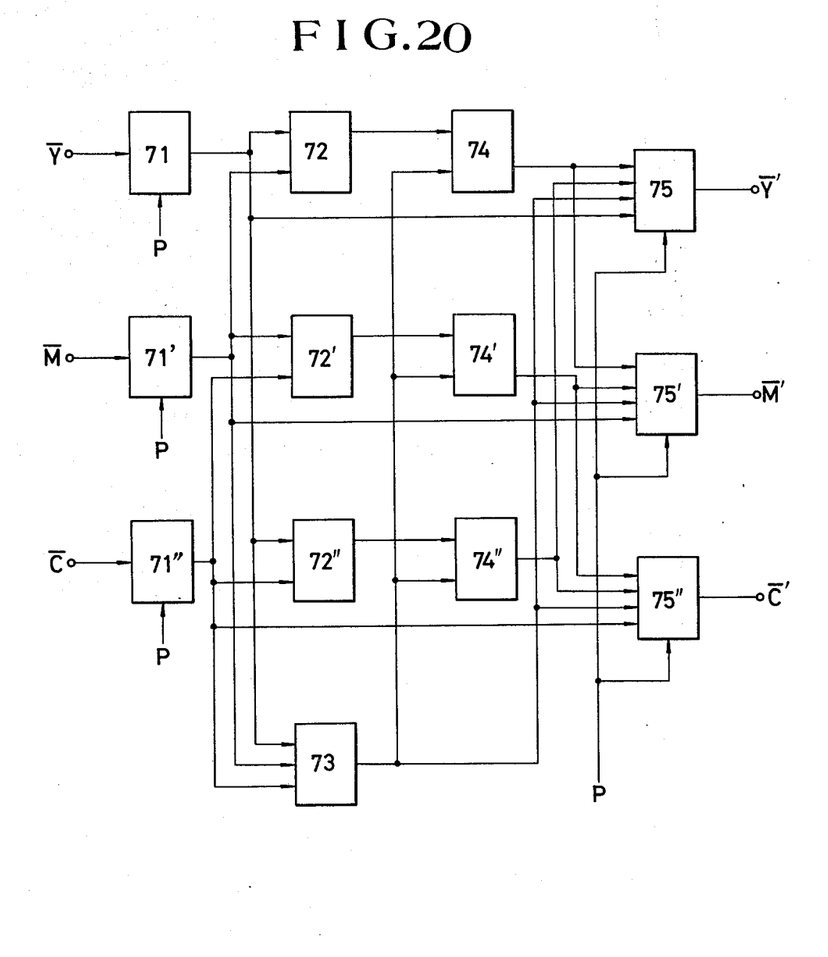
FIG. 20 is a block diagram of the device to carry out the method as disclosed in FIGS. 14 to 19.

The block diagram in FIG. 20 for the above-mentioned regulations will be explained in the following. The terminals $\overline{Y}$, $\overline{M}$ and $\overline{C}$ are connected to the picture signals in FIG. 7, respectively. The numerals 71 – 71″ are clamping circuits and output amplifiers, where each 0% level of the picture signals $\overline{Y}$, $\overline{M}$ and $\overline{C}$ is fixed to a constant DC voltage, and pulses having corresponding 100% potential level are added to the retrace periods of the picture signals. The outputs of said clamping and output amplifiers 71 – 71″ are connected to secondary color signal detecting circuits 72 – 72″ to detect each of $\overline{YM}$, $\overline{MC}$ and $\overline{CY}$ in FIG. 15, with all three amplifiers connected to a tertiary color signal detecting circuit 73 to detect the signal $-\overline{YMC}$. The circuits 74 – 74″ remove the tertiary color components from the secondary color signals, that is, the outputs of the secondary color signal detecting circuits 72 – 72″ are combined with the output of the tertiary color signal detecting circuit 73, and the combined signals are reversed to obtain the signals of $(-\overline{YM}+\overline{YMC})$, $(-\overline{MC}+\overline{YMC})$ and $(-\overline{CY}+\overline{YMC})$. The circuits 75 – 75″ are addition circuits, and the outputs $\overline{Y}$, $\overline{M}$ and $\overline{C}$ of the clamping and output amplifiers 71 – 71‴, the outputs $(-\overline{YM}+\overline{YMC})$, $(-\overline{MC}+\overline{YMC})$ and $(-\overline{CY}+\overline{YMC})$ of said circuits 74 – 74″ to remove the tertiary color from the secondary colors, and the output $-\overline{YMC}$ of the tertiary color signal detecting circuit 73 are connected to said circuits 75 – 75″, respectively. Thus the signals are combined with the predetermined regulation factors, and negative pulses having 100% level are added to the retrace periods of the signals, whereby the corrected outputs $\overline{Y}'$, $\overline{M}'$ and $\overline{C}'$ are obtained.

Figure 21:
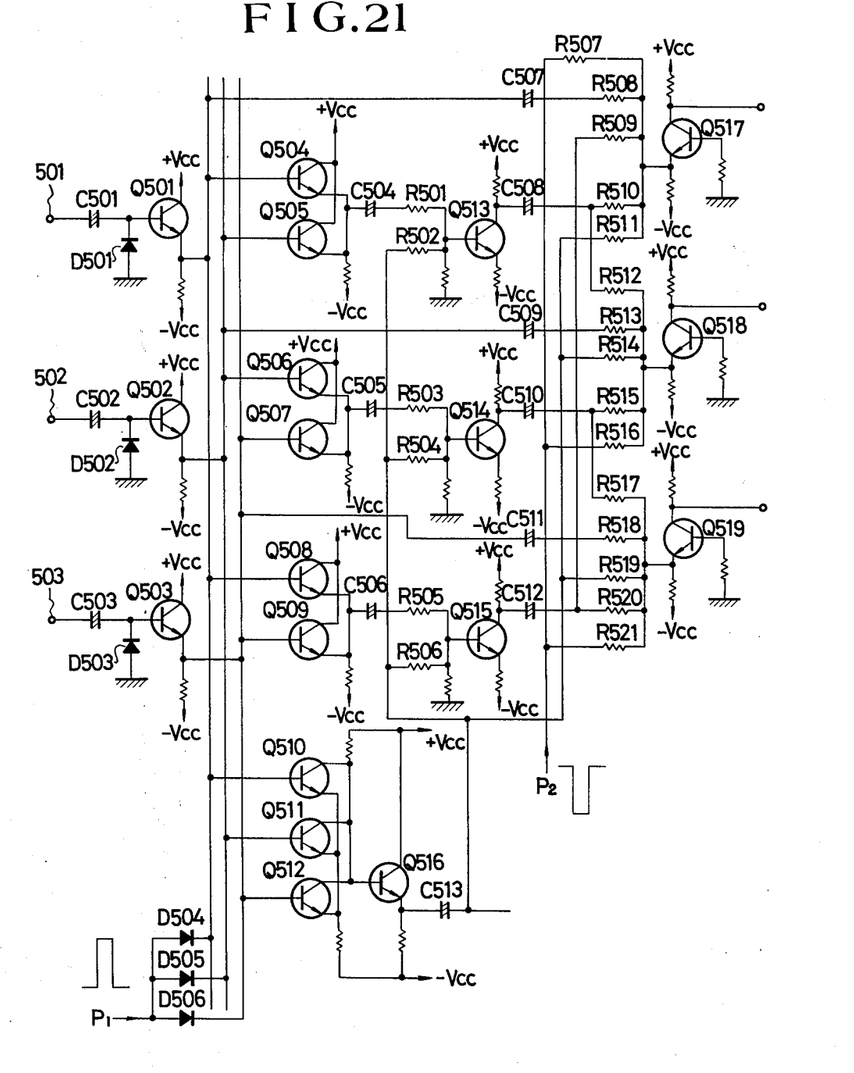
FIG. 21 is a circuit diagram of the device in FIG. 20.

The abovementioned example will be further explained with reference to the accompanying circuit in FIG. 21. The primary color picture signal $\overline{Y}$ is connected to an input terminal 501, and the 0% level of said signal is fixed to a constant DC voltage by a capacitor C501 and a diode D501, then taken out from the emitter of a transistor Q501, further the pulse $P_1$ is added to the retrace period by a diode D504. In like manner as the above, the primary color picture signal $\overline{M}$ is connected to the input terminal 502, and the 0% level of said signal is fixed to the constant DC voltage by a capacitor C502 and a diode D502. Then the signal is taken out from the emitter of a transistor Q502, and the pulse $P_1$ is added to the retrace period by a diode D505. The primary color picture signal $\overline{C}$ is likewise connected to the input terminal 503, and the 0% level of said signal is fixed to the constant DC voltage by a capacitor C503 and a diode D503. Then the signal is taken out from the emitter of a transistor Q503, and the pulse $P_1$ is added to the retrace period by a diode D506. The emitters of transistors Q504 and Q505 are connected with each other, and only the signal having a higher DC voltage between the base inputs of the transistors Q504 and Q505 is passed through, thus the NAM portion ($\overline{YM}$ in FIG. 15) in the picture signals $\overline{Y}$ and $\overline{M}$ can be taken out from the emitters. In like manner, the NAM portion ($\overline{MC}$ in FIG. 15) of the picture signals $\overline{M}$ and $\overline{C}$ is taken out from the emitters of transistors Q506 and Q507, and the NAM portion ($\overline{CY}$ in FIG. 15) of the signals $\overline{Y}$ and $\overline{C}$ is taken out from the emitters of transistors Q508 and Q509. The reversed signal $-\overline{YMC}$ of the NAM portion signal $\overline{YMC}$ among the picture signals $\overline{Y}$, $\overline{M}$ and $\overline{C}$ can be obtained from the collectors of transistors Q510, Q511 and Q512. The signals $\overline{YM}$ and $-\overline{YMC}$ are supplied to the base of a transistor Q513 through a capacitor C504 and resistors R501 and R502. Thus the reversed signal $(-\overline{YM}+\overline{YMC})$ of the signal $(\overline{YM}-\overline{YMC})$ is obtained from the collector of the transistor Q513. The values of the resistors R501 and R502 may be determined such that the tertiary color signal $\overline{YMC}$ becomes zero at the collector of the transistor Q513. In like manner as the above, the signals $\overline{MC}$ and $-\overline{YMC}$ are added to the base of a transistor Q514 through a capacitor C505 and resistors R503 and R504 to obtain the signal $(-\overline{MC}+\overline{YMC})$ from the collector of the transistor Q514. The signal $\overline{CY}$ and $\overline{YMC}$ are added to the base of a transistor Q515 through a capacitor C506 and resistors R505 and R506 to obtain the signal $(-\overline{CY}+\overline{YMC})$ from the collector of the transistor Q515.

To the emitter of a transistor Q517 are added pulse $P_2$, $\overline{Y}$, $-\overline{YMC}$, $(-\overline{YM}+\overline{YMC})$ and $(-\overline{CY}+\overline{YMC})$ through resistors R507, R508, R509, R510 and R511, respectively. The ratios of additions of said signals $\overline{Y}$, $-\overline{YMC}$, $(-\overline{YM}+\overline{YMC})$ and $(-\overline{CY}+\overline{YMC})$ are determined by the respective impedances of the resistors R508, R509, R510 and R511. Accordingly, each of them have predetermined values. The signal $(\overline{Y}' = \overline{Y} + r' + g' + bl')$ is obtained from the collector of the transistor Q517.

To the emitter of a transistor Q518 are added $(-\overline{YM}+\overline{YMC})$, $\overline{M}$, $-\overline{YMC}$, $(-\overline{MC}+\overline{YMC})$ and pulse $P_2$ through resistors R512, R513, R514, R515 and R516, respectively. In like manner as the above, the signal $(\overline{M}' = \overline{M} + r' + b' + bl')$ can be obtained from the collector of the transistor Q518. Further, $(-\overline{MC}+\overline{YMC})$, $\overline{C}$, $-\overline{YMC}$, $(-\overline{CY}+\overline{YMC})$ and the pulse $P_2$ are added to the emitter of a transistor Q519 through resistors R517, R518, R519, R520 and R521, respectively. Thus, the signal $(\overline{C}' = \overline{C} + g' + b' + bl')$ is obtained from the collector of the transistor Q519.

Figure 22:
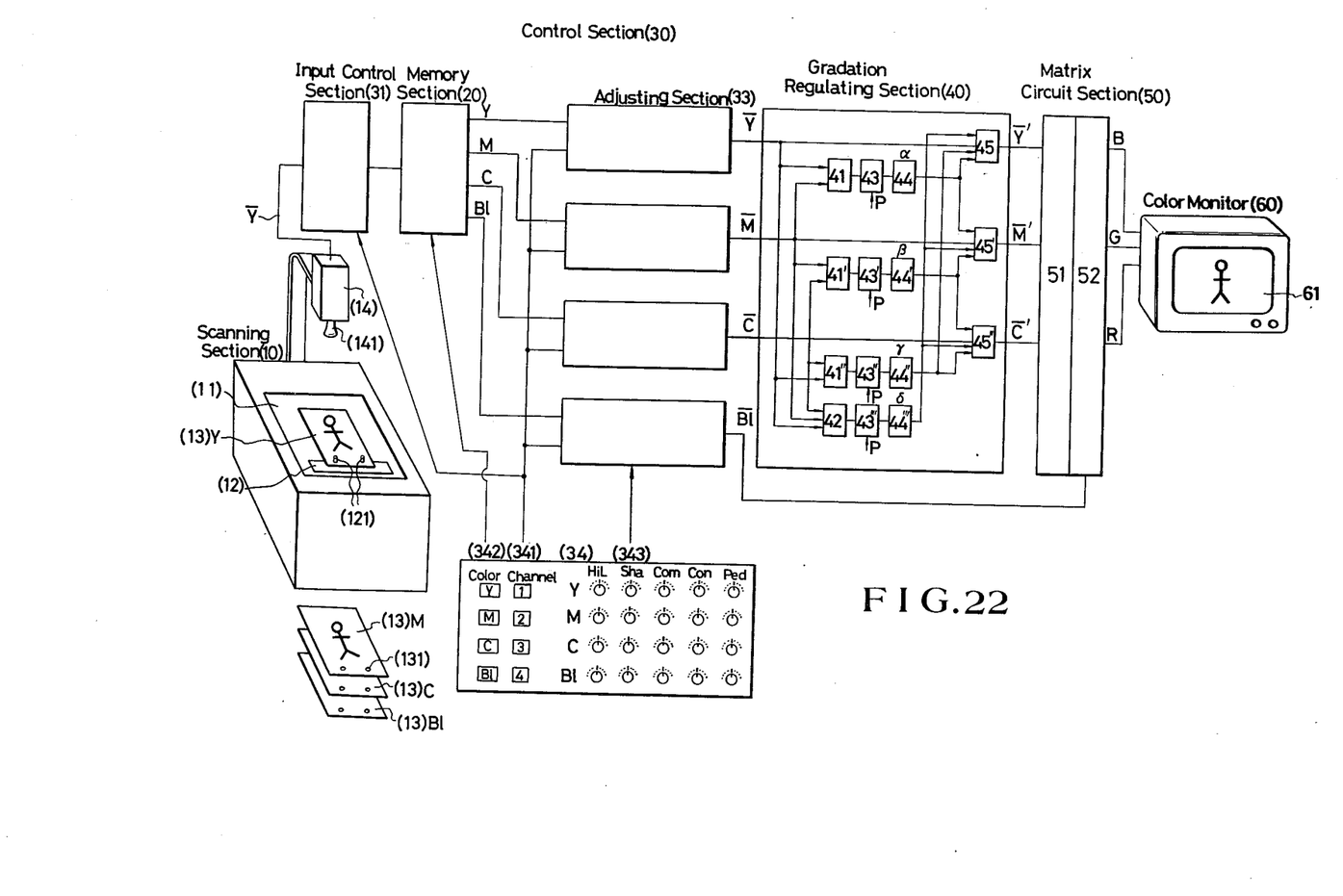
FIG. 22 is a block diagram of an image correction apparatus of the present invention.

Referring now to FIG. 22, the proof-viewing apparatus of the present invention will be explained. This apparatus comprises a scanning section 10, a memory section 20, a control section 30, a gradation regulating section 40, a matrix circuit section 50 and a color monitor 60.

Each color separation film 13 placed on a film stand 11 is scanned by a camera 14 in the scanning section 10. The film stand 11 consists of a sheet of ground glass illuminated from the lower side by an appropriate light source or sources. Said film stand 11 is further provided with a pin bar 12 in movable manner, and said pin bar 12 is provided with pins 121 which are to be inserted in the perforations 131 of each separation film 13 in order to fix said separation film 13 to a predetermined position of the film stand 11. The camera 14 is an ordinary black-and-white television camera and provided with a zoom lens 141.

The picture signals which are obtained by scanning the separation films 13 one by one using the above scanning section 10, are introduced to the input control section 31 of the control section 30, then the signals are introduced to the memory section 20 and retained therein. The input control section 31 controls the input picture signals according to the kind of separation films (i.e. halftone positives, halftone negatives, continuous tone positives or continuous tone negatives), and this is carried out by the below-mentioned channel selection switch 341 on the operation panel 34.

The picture signals controlled by said input control section 31 are separately memorized to the respective magnetic recording tracks in said memory section 20 by means of the color selection push-buttons 342 on said operation panel 34. That is, for example, when a yellow separation film 13Y is scanned by pushing Y of the push-button 342, the picture is memorized to the yellow track of said memory section 20. In the next step, the magenta separation film 13M is scanned by pushing M of the push-button 342, and the picture color signal of magenta is memorized to the magenta track of said memory section 20. With regard to other colors, the above steps can be applied in like manner.

The picture signals $\overline{Y}$, $\overline{M}$, $\overline{C}$ and $\overline{Bl}$ in respective colors retained in said memory section 20 are then read out and introduced to the adjusting section 33 through channel selection switch 341. Said adjusting section 33 is provided with several control circuits of highlight control, shadow control, compression control, contrast control and pedestal control to each channel, and controlling knobs 343 for respective colors and kinds of controllings to each channel are provided on the operation panel 34.

In the operation of the control section 30 consisting of the above-mentioned input control section 31, channel selection switch 341 adjusting section 33 and operation panel 34, some predetermined conditions (hereinafter referred to as "general conditions") depending upon the kind of separation films, type of printing plates, and kinds of inks and paper can be set by selecting the channel, and this setting is carried out by pushing the channel selection switch 341. Each channel is previously adjusted to each general condition which is often employed in the process of printing works.

For example, the first channel is adjusted to offset printing, halftone negatives of separation films to be scanned, certain inks for offset printing and art paper, while the second channel is adjusted to offset printing, halftone positives, certain inks for offset printing and coated paper. Further, respective channels of said adjusting section 33 are adjusted to the respective general conditions mentioned above. By pushing the first channel button of the channel selection switches 341, the picture signals from the halftone negatives are adjusted to certain signals through said input control section 31, while the picture signals from the halftone positives are adjusted to certain signals by pushing the second channel button. After the signals are adjusted in connection with the kinds of separation films and other conditions, they are stored in the memory section 20. The signals are then read out from the memory section 20 and the respective picture signals Y, M, C and Bl are introduced to the selected adjusting section 33 through said channel selection switch 341. After the signals are adjusted through said adjusting section 33, they are introduced to the gradation regulating section 40, in which the primary color signals Y, M and C are regulated as disclosed in the foregoing explanation with regard to FIG. 12.

The gradation regulating section 40 comprises, as disclosed in the foregoing, secondary color detecting circuits 41 – 41''; a tertiary color detecting circuit 42; circuits for reversing of secondary and tertiary color signals and for mixing of pulses (P) 43 – 43'''; regulating circuits 44 – 44''''; and addition circuits 45 – 45''. The secondary and tertiary color portions of primary colors are reduced by this gradation regulating section 40 to produce the corrected primary color picture signals Y', M' and C'.

Thus corrected picture signals Y', M' and C' are introduced to the matrix circuit section 50 together with the black picture signal Bl. The matrix circuit section 50 converts the picture signals Y', M', C' and Bl into the image signals for a color television. With regard to the above-mentioned color correction circuit 51, since the color characteristics of R, G and B of color monitor 60 are different from those of the printings, the picture signals of Y', M' and C' are respectively added to B', G' and R' as shown in FIG. 28 in order to approximate each to the other. Further, this matrix circuit section consists of a color correction circuit 51 and a black addition circuit 52, and the image signals R, B and G as obtained from this matrix section 50 are transmitted to a color monitor 60 having a Braun tube 61 just like those of the ordinary color televisions. Thereby, an image is produced on the color monitor 60 which closely resembles the printed picture made from separation films of yellow, magenta, cyan and black.

In the use of the apparatus of the present invention before the proof-viewing operation, the regulation factors $\alpha$, $\beta$, $\gamma$ and $\delta$ or $a$, $d$, $e$ and $f$ of the regulating circuits 44 – 44''' of gradation regulating section 40 are adjusted so as to approximate the image of monitor to the printed picture. Then, the input control section 31 and the adjusting section 33 are adjusted to every channel according to the general conditions in the particular printing works.

In the proof-viewing operation, the channel is firstly determined according to the general condition, and the channel selection switch 341 is pushed down. On this occasion, all of the knobs 343 for controlling the adjusting section 33 are to be set to zero points. Further, pushing the color selection push-buttons 342, four separation films 13 are scanned one by one in the scanning section 10, thus the respective color images are superposed on the color monitor 60, which indicates the similar status that said color separation films 13 are used for printing without corrections. When the image on color monitor 60 is the same as the image of the desired printings, the separation films 13 for Y, M, C and Bl are transferred to the succeeding plate-making process.

In case the image on the color monitor 60 is not desirable as the printed picture, the knobs 343 of the operation panel 34 must be controlled. For example, if the image on the color monitor 60 is somewhat reddish on the whole, the knob 343 of the pedestal control in magenta is turned to the minus direction so as to reduce the red content accordingly. When the color of the image becomes satisfactory by such adjusting, the amount of rotation of said knob 343 is read, from which the value of correction of the separation film 13 to form the press plate can be determined. If such corrections are necessary, an indication to make appropriate corrections is given when separation films 13 for Y, M, C and Bl are transferred to the succeeding plate making step, so that such corrections are effective in the preparation of pressed plates. In practice, the conditions for halftone photographing and reversing are determined from the four separation films 13 for Y, M, C and and retouching is performed using a reducer. If such corrections cannot be satisfactorily carried out, the corrections are effective by preparing a new set of separation films from the original picture taking the obtained correction factors into consideration.

Further, in case detailed conditions for correction with regard to some specific portion (e.g. the face portion) of separation films are to be obtained, the stored signals in the memory section 20 are cancelled, the magnification of the of the zoom lens 141 is enlarged, and the pin bar 12 is moved so as to scan the face portion of separation films 13. Then, four separation films 13 are scanned one by one in like manner as the foregoing, whereby only the face portion is imaged on the color monitor 60 and detailed correction can be carried out thereby.

In accordance with the method and apparatus of the present invention, the problems of repeated proof-viewing can be simplified and the efficiency of color printing work can be promoted. It should be emphasized, however, that the specific embodiments described and shown herein are intended as merely illustrative and in no way restrictive of the invention.

What is claimed is:

1. A method for image regulation of a color monitor in proof-viewing which comprises the steps of: scanning a plurality of separation films, each film having one primary color, to obtain a like plurality of primary color picture signals; obtaining each of a plurality of secondary color picture signals from an NAM (Non-Additively Mixing) portion which is derived by detecting the maximum value of each respective one of all combinational pairs of said primary color picture signals; obtaining a tertiary color picture signal from the NAM portion which is derived by detecting the maximum value of a combination of all said primary color picture signals; regulating said secondary and tertiary color picture signals by multiplying regulation factors; correcting the gradations of said primary color picture signals by said regulated secondary and tertiary color picture signals; and producing an image on the color monitor screen wtih said corrected primary color picture signals and said tertiary color picture signal.

2. A method for image regulation of a color monitor in proof-viewing which comprises the steps of: scanning a plurality of separation films, each film having one primary color, to obtain a like plurality of primary color picture signals; obtaining each of a plurality of secondary color picture signals from a NAM (Non-Additively Mixing) portion which is derived by detecting the maximum value of each respective one of all combinational pairs of said primary color picture signals; obtaining a tertiary color picture signal from the NAM portion which is derived by detecting the maximum value of a combination of all said primary color picture signals; adding a pulse respectively corresponding to a 100% level of each of said secondary and tertiary color picture signals to the retrace period of each respective signal; reversing and correcting the signals with correction factors to obtain reversed corrected secondary and tertiary color signals; correcting for the gradation and hue of said secondary and tertiary color picture signals contained in said primary color picture signals by adding to each of the primary color picture signals those signals among said reversed corrected secondary color signals derived from any pair including the respective one of said primary color picture signal, and said reversed corrected tertiary color signal; and producing an image on the color monitor screen with the corrected primary color picture signals and said tertiary color picture signal.

3. An apparatus for image regulation of a color monitor in proof-viewing which comprises: a scanning section which scans a set of color separation films; a memory section which memorizes a set of primary color picture signals obtained in said scanning section; a control section which controls each of the primary color picture signals read out from said memory section in accordance with predetermined characteristics for the kind of separation film (halftone positives, halftone negatives, continuous tone positives, or continuous tone negatives) being utilized; a gradation regulating section which produces secondary and tertiary color picture signals from said controlled primary color picture signals and regulates the gradation of secondary and tertiary color portions of the primary color picture signals; a matrix circuit section which produces a set of image signals from said corrected primary color picture signals and black picture signals; and a color monitor which produces an image with the image signals from said matrix circuit section.

4. An apparatus for image regulation of color monitor in proof-viewing as claimed in claim 3, in which said control section is provided with a plurality of channels and channel selection switches, each channel being adapted to a single kind of separation film.

5. An apparatus for image regulation of a color monitor in proof-viewing as claimed in claim 3, in which said scanning section is providied with a movable pin bar to support said separation films so as to move a certain portion of said separation films to the scanning position; and means for producing an enlarged image of said certain portion.

6. A method for image regulation of a color monitor in proof-viewing which comprises the steps of: scanning a plurality of separation films, each film having one primary color, to obtain a like plurality of primary color picture signals; obtaining a like plurality of pulse-added primary color signals by adding a pulse having a peak corresponding to a 100% level of each respective primary color picture signal to a retrace period of each respective primary color picture signal; obtaining each of a plurality of secondary color picture signals from the NAM (Non-Additively Mixing) portion which is derived by detecting the maximum value of each respective one of all combinational pairs of said pulse-added primary color picture signals; obtaining a tertiary color picture signal from the NAM portion which is derived by detecting the maximum value of a combination of all said pulse-added primary color picture signals; obtaining reversed secondary and tertiary color picture signals by reversing each of said secondary and tertiary color picture signals; adding said reversed tertiary color signal to each of said reversed secondary color signals to obtain each of a plurality of partially-corrected reversed secondary color signals; obtaining fully-corrected reversed secondary color signals by combining each partially corrected reversed secondary color signal with a correction factor; obtaining a reversed corrected tertiary color signal by combining a correction factor with said reversed tertiary color signal; adding to each of said primary color picture signals, those signals among said reversed fully-corrected secondary color signals derived from any pair including that respective one of said primary color picture signals, and said reversed corrected tertiary color signal so as to correct the gradation and hue of said secondary and tertiary color picture signals contained in said primary color picture signals; and producing an image on the color monitor screen with the corrected primary color picture signals and said tertiary color picture signal.

* * * * *